US006401624B1

(12) United States Patent
Nijenhuis

(10) Patent No.: US 6,401,624 B1
(45) Date of Patent: Jun. 11, 2002

(54) RAILWAY TERMINAL FOR CONTAINERS, AND RAILWAY WAGON

(75) Inventor: Harry Nijenhuis, Hoogeveen (NL)

(73) Assignee: Harry Nijenhuis Management B.V, Hoogeveen (NL)

( * ) Notice: Subject to any disclaimer, the term of this patent is extended or adjusted under 35 U.S.C. 154(b) by 0 days.

(21) Appl. No.: 09/380,631

(22) PCT Filed: Mar. 5, 1998

(86) PCT No.: PCT/NL98/00127

§ 371 (c)(1),
(2), (4) Date: Nov. 5, 1999

(87) PCT Pub. No.: WO98/39191

PCT Pub. Date: Sep. 11, 1998

(30) Foreign Application Priority Data

Mar. 6, 1997 (NL) .............................................. 1005456

(51) Int. Cl.[7] ................................................ B61B 1/00
(52) U.S. Cl. .......................................... 104/29; 104/30
(58) Field of Search ............................... 104/27, 28, 29, 104/30, 48, 243, 306; 105/436, 458, 215.1, 216, 217, 211, 199.1, 199.3, 159, 199.2; 414/333, 343, 373, 401, 362; 410/65, 67; 364/426.05; 701/20

(56) References Cited

U.S. PATENT DOCUMENTS

| 2,190,708 A | * | 2/1940 | Fowler ........................ 105/436 |
| 2,843,276 A | * | 7/1958 | Copeland ..................... 104/29 |
| 2,896,548 A | * | 7/1959 | Obes ............................ 104/48 |
| 2,920,580 A | * | 1/1960 | Williams ...................... 104/29 |
| 3,376,831 A | * | 4/1968 | Eaton et al. ................ 105/199.1 |
| 3,400,668 A | * | 9/1968 | Lich ........................... 105/199.1 |
| 3,516,368 A | * | 6/1970 | Wright ........................ 105/455 |
| 3,774,550 A | * | 11/1973 | Lich ........................... 105/199.1 |
| 4,016,991 A | * | 4/1977 | Oldford ....................... 105/436 |
| 4,124,129 A | * | 11/1978 | Barry ........................... 104/28 |
| 4,154,170 A | * | 5/1979 | Williams ...................... 104/29 |
| 4,190,393 A | * | 2/1980 | Landow ....................... 104/29 |
| 4,368,672 A | * | 1/1983 | Germer ...................... 105/199.1 |
| 4,522,546 A | * | 6/1985 | Ringer ......................... 104/48 |
| 4,546,707 A | * | 10/1985 | Siffrin ....................... 105/199.1 |
| 4,964,767 A | * | 10/1990 | Leitz .......................... 105/159 |
| 5,226,367 A | * | 7/1993 | McLaughlin ................. 104/29 |
| 5,356,257 A | | 10/1994 | Nijenhuis .................... 414/495 |
| 5,544,057 A | * | 8/1996 | Matsuoka ............. 364/426.05 |
| 5,588,368 A | * | 12/1996 | Richter et al. ........... 105/199.1 |
| 5,784,969 A | * | 7/1998 | Steidl et al. ............. 105/199.2 |

FOREIGN PATENT DOCUMENTS

| DE | 1 176 172 | 8/1964 | |
| DE | 3905641 A1 | 8/1990 | .......... B65G/67/02 |
| DE | 43 16 535 | 11/1994 | |
| DE | 44 14 528 | 11/1995 | |
| FR | 2 644 442 | 2/1990 | .......... B65G/67/02 |
| GB | 990129 | 4/1965 | |

* cited by examiner

Primary Examiner—S. Joseph Morano
Assistant Examiner—Lars A. Olson
(74) Attorney, Agent, or Firm—Sughrue Mion, PLLC

(57) ABSTRACT

The present invention provides an improved railway terminal for the loading and unloading of railway cars. In particular, the present invention is directed to avoid the problems associated with railway cars springing in and out during loading or unloading. The present invention uses supports arranged on either side of the section of track, at which the railway wagon is to be loaded and unloaded, so that the loading floor of the railway wagon or car will remain at a fixed and predetermined height during the loading or unloading. The present invention contemplates the uses of cylinders or pistons as the supports used to place the railway car or wagon at a predetermined height.

15 Claims, 3 Drawing Sheets

RAILWAY TERMINAL FOR CONTAINERS, AND RAILWAY WAGON

BACKGROUND OF THE INVENTION

1. Field of the Invention

The present invention relates to a railway terminal for loading railway wagons with containers and/or unloading railway wagons which are laden with containers, comprising:

a section of track, and at least one loading and/or unloading platform which is arranged along and adjacent to the said section of track and which is at a higher level than the said section of track.

2. Description of the Related Art

A railway terminal of this kind is generally known. At a railway terminal of this kind, and also at a railway terminal according to the invention, so-called 20-foot, 30-foot and 40-foot containers can be loaded from the train and onto lorries or from the lorry onto the train. In this case, the railway wagons have an essentially flat loading floor. By means of so-called trolleys, such as for example those which are known from and described in the European Patent EP-B1-0,509,028, the containers can then be displaced in their transverse direction in order to be moved from the platform onto the railway wagons or from the railway wagons onto the platform.

Although the trolleys disclosed by EP-B1-0,509,028 are able to overcome differences in height, and hence also a difference in height between the platform (loading and/or unloading platform) and the railway wagon(s) placed alongside it, the problem continues to arise that this difference in height varies within relatively wide limits. Such a variation can be attributed firstly to different types of railway wagons, in particular the height thereof with respect to the rails, and secondly to the fact that the height of the loading floor with respect to the track (the rails) is dependent on the load on the railway wagon. When a container is placed on the railway wagon, the railway wagon will sink deeper into its suspension depending on the weight of the container and its contents, with the result that the top surface of the loading floor lies at a lower level. When a container is transferred from the railway wagon onto the adjoining platform, the suspension of the railway wagon will spring outwards, so that the top surface of the loading floor lies at a higher level. In this case, the differences in height may even be such that they can no longer be overcome using the standard trolleys.

SUMMARY OF THE INVENTION

The object of the present invention is to provide an improved railway terminal, in particular to provide a railway terminal which does not have the abovementioned drawbacks.

This object is achieved according to the invention by the fact that supports are arranged on either side of the section of track, on which supports the superstructure, comprising the loading floor, of a railway wagon to be loaded and/or unloaded can be supported, in such a manner that the loading floor of the said railway wagon is held at a fixed, predetermined height during loading and/or unloading. The drawbacks of the railway wagons springing in and out during loading and unloading are consequently avoided. Supports of this kind may, for example, comprise piston/cylinder units which are disposed vertically on the ground, the pistons of which can be extended upwards to against the superstructure of a railway wagon, in order to support this superstructure at a specific height and, if appropriate, firstly to lift it to this specific height. Cylinder/piston units of this kind can then be fixed in a specific position during loading and unloading.

However, the supports may advantageously also be arranged at a fixed height, in which case the railway wagon, or at least the superstructure thereof, can be lowered onto these supports. For this purpose, the railway terminal according to the invention advantageously also comprises at least one railway wagon which is provided with setting means with which the superstructure can be vertically adjusted with respect to the section of track so as to be supported on and moved upwards from the supports. The setting means used may advantageously be the suspension, in particular the hydraulic or pneumatic suspension. According to an advantageous further embodiment, the setting means then also comprise a hydraulic or pneumatic suspension, which is designed so that it can be activated in order to move the superstructure above the supports or move it upwards and so that it can be let down in order to support the superstructure on the supports. By building up or releasing pressure in the hydraulic or pneumatic suspension system. it is possible to carry out the vertical adjustment of the superstructure. A pneumatic suspension is particularly preferred here, since a suspension system of this kind contributes to reducing the noise produced while the railway wagons are being driven.

In order to ensure, with different types of wagon, that the height difference, in the lowered position, between the loading floor of the railway wagon and the adjoining loading and/or unloading platform is at or approaches a predetermined level, it is advantageous according to the invention if the superstructure of the railway wagon is provided on either side with downwardly facing stop surfaces, by means of which the railway wagon can be supported on the supports, and if the distance from the stop surfaces to the loading floor (or at least the reference plane thereof) preferably has a predetermined value. The predetermined value of this distance will be dependent on the desired difference in height, in the lowered position, between the loading floor and the adjoining loading and/or unloading platform.

In order to facilitate loading and unloading, and to reduce the time required for these operations, it is advantageous according to the invention if the supports are arranged at such a height that, in the position where the superstructure of a railway wagon is supported on them, there is an essentially flat connection between the loading floor and the respectively adjoining loading and/or unloading platform. An essentially flat connection is to be understood here as a difference in height which can easily be overcome by a trolley without special measures, and without having to interrupt the sideways transfer movement of a container to do this. Such a difference in height will then be a difference in height which can be overcome easily by the rollers or wheels of the trolley. In practice, such a difference in height can amount to a few millimeters, for example approximately 1 to 5 mm. The adjustment mechanism which is known from EP-B1-0,509,028 (cf. in particular the explanation given with reference to FIGS. 7 and 8 of this document) used to overcome a difference in height is thus made superfluous, thereby facilitating the design of the trolleys considerably.

A further advantageous embodiment provides for a railway terminal in which a platform is arranged on both sides of the section of track for loading or unloading purposes. It is in this case advantageous according to the invention if a loading platform is arranged on one side of the section of track, while an unloading platform is arranged on the other side of the section of track, and if, in the supported position, the loading floor, for the essentially flat connection to the loading platform, is at a lower level than the top surface of the loading platform and, for the essentially flat connection to the unloading platform, is at a higher level than the top surface of the unloading platform. An embodiment of this kind ensures at all times that the height difference to be overcome by the trolleys or other transfer means when transferring a container will be a negative difference in height, i.e. the base slopes downwards, when viewed in the direction of transport of the container. A downward slope of this nature may amount to a few millimeters, for example 1 to 5 mm up to 1 cm, if necessary, without major problems.

The present invention furthermore relates to a railway terminal for loading railway wagons with containers and unloading railway wagons which are laden with containers, comprising:

a section of track, a loading platform which is arranged along and adjacent to one side of the said section of track and which is at a higher level than the said section of track, and/or an unloading platform which is arranged along and adjacent to the other side of the said section of track and which is at a higher level than the said section of track, characterized in that the top surface of the loading platform slopes downwards towards the section of track, and respectively or in that the top surface of the unloading platform slopes down away from the section of track. A railway terminal of this kind can be used very advantageously in combination with a railway terminal as discussed above. A slope of this kind on the top surface of the loading platform and respectively or the unloading platform facilitates transferring containers sideways towards and away from the section of track, due to the fact that the force of gravity also has an effect. This measure in particular facilitates setting and keeping the containers to be transferred in motion.

Advantageously, the slope of the unloading platform and respectively or the slope of the loading platform will in each case amount to approximately 0.1 cm to 0.8 cm, for example approximately 0.5 cm, per meter of platform width. However, it will be clear that a slope of 1 cm, possibly even slightly more, per meter of platform width is also conceivable. It is important here that the slope be such that a container which is laden to its maximum permissible weight, when it has been placed on, for example, trolleys, cannot slide or roll off to the side of its own accord.

According to a further advantageous embodiment, the top surface of the loading platform and the top surface of the unloading platform will be essentially aligned with one another. The loading floor of the railway wagon which is to be placed between the loading platform and the unloading platform will in this case advantageously be able to be lowered until it is essentially aligned with the loading platform and unloading platform, in which case the connection between the loading floor and the loading platform or the unloading platform may always exhibit a downward slope, as discussed above, in the direction of transport of the container.

The invention furthermore relates to a railway wagon for transporting containers, which railway wagon is particularly suitable for use in a railway terminal according to the invention.

The invention furthermore relates to a lifting device for placing a container, which is standing on folded-out legs, onto the ground with the legs folded in, and for placing such a container which is standing on the ground with the legs folded in on folded-out legs, such as in particular a container in accordance with DIN EN 284, the lifting device comprising at least two cylinder/piston units, which are positioned at a distance from one another, and preferably four cylinder/piston units, which are preferably spaced apart in a rectangular pattern, these cylinder/piston units being disposed vertically in the ground, the piston rods being provided at their free ends with a bearing part on which the container can be supported, and it being possible to retract and extend the piston rods in pairs between a retracted position, in which the bearing part is completely recessed in the ground, and an extended position, in which the distance between the bearing parts and the ground is greater than the standing height of the folded-out legs. A lifting device of this kind allows in particular so-called DIN EN 284 containers (DIN stands for Deutsche Industries Norm) to be placed with a bottom surface on the ground, or conversely to be placed on their folded-out legs with their base raised above the ground. Containers of this kind are used frequently, in particular in Germany, for road haulage. In this case, the container is transported with its legs folded in and placed on the lorry, the lorry being stopped at the designated destination, where the legs are folded out and the lorry is driven away beneath the container. If such containers are then to be transported by railway, the legs must first be folded in. This can be carried out with the aid of cranes, which can take hold of the containers from above. However, such cranes are unsuitable for transferring the container onto a railway wagon (or conversely from the railway wagon onto the platform), since the electrical wiring above the track will be in the way. The lifting device according to the invention is inexpensive to realize and can easily be incorporated in the ground, in particular in the platform, at the loading and/or unloading sites where the containers are transferred onto railway wagons or removed from railway wagons. The lorry will in this case drive such a DIN EN 284 container to above the cylinder/piston units, in order to leave the container behind in the usual manner at that location, resting on its legs, after which, by extending the piston rods, the container can be lifted slightly off the ground, so that the legs can be folded in, after which the piston rods can be retracted again in order to lower the container until its bottom surface rests on the ground. The bearing parts of the piston rods are then lowered into the ground by retracting the piston rod further, so that these bearing parts are no longer in the way. However, it will be clear that this lowering/ability to be lowered of the bearing parts into the ground is only an advantageous option, since it may also be useful if the container is supported just above the ground by bearing parts. The container may then be transferred from the platform onto the railway wagon, for example by means of the abovementioned trolleys. The lifting device according to the invention can be employed advantageously even for unloading such DIN EN 284 containers from the railway wagon. In this case, the container is then moved, for example by means of the abovementioned trolleys, from the railway wagon onto the platform, until it is above the cylinder/piston units which are disposed in the ground, in this case in the platform. After optionally uncoupling the trolleys, the container can then be lifted by means of the cylinder/piston units to a height which is slightly higher than the standing height of the folded-out legs. This makes it possible to fold out the legs, after which the piston rods are retracted again, so that the container is placed on its folded-out legs, and then the piston rods can be retracted again entirely, optionally as far as the position in which they are recessed in the ground.

BRIEF DESCRIPTION OF THE DRAWINGS

The present invention will be explained in more detail below with reference to the exemplary embodiments depicted in a drawing, in which:

FIG. 1 diagrammatically shows a railway terminal 1 which is positioned parallel to a through track 2. FIG. 1 shows a track with overhead lines, but it will be clear to a person skilled in the art that the invention essentially applies also to a track without overhead lines.

The railway terminal 1 comprises a section of track 3, which branches off as a siding from the through track 2, running parallel to the latter and then rejoining this track 2 subsequently. A platform 4 and 5, which is at a higher level than the section of track 3, is provided on either side of the section of track 3. With a view too, inter alia, the logistics, it is advantageous here if one platform, platform 4, is designed as the loading platform, while the other platform, platform 5, is designed as the unloading platform. In this case, containers 7 are placed on the railway wagons 6 from the loading platform 4, while containers 10 unloaded from the railway wagons are placed on the unloading platform 5. FIG. 1 furthermore shows a locomotive 27, with in this case, by way of example, five railway wagons 6 behind it. However, it will be clear that the number of railway wagons 6 may be much higher, and that accordingly the loading and unloading platforms 4 and 5, respectively, may be considerably longer.

DETAILED DESCRIPTION OF THE INVENTION

Figure 1:
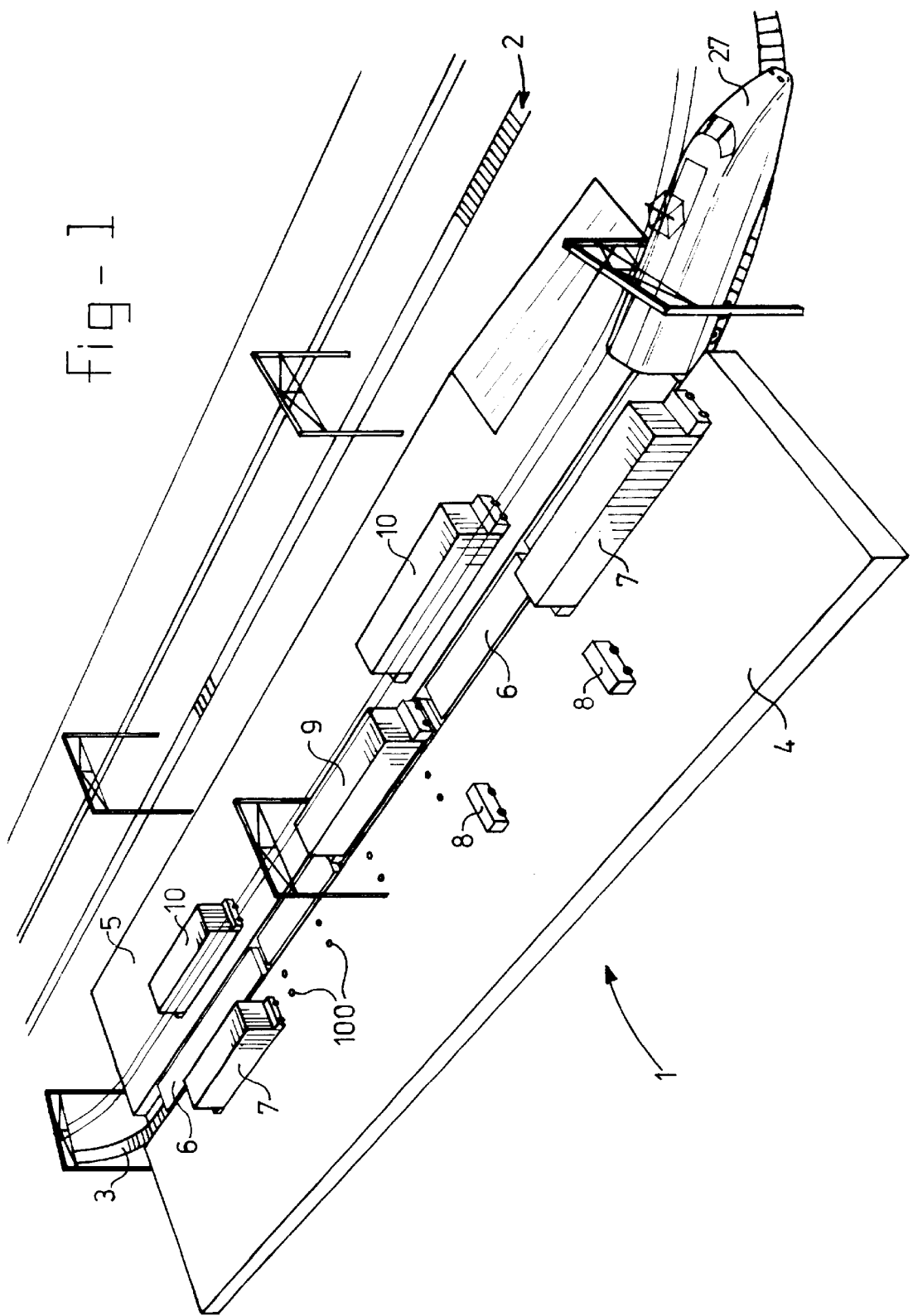
FIG. 1 shows a diagrammatic, perspective view of a railway terminal according to the invention.

The containers to be loaded onto the railway wagons 6 are brought in by lorries and are placed on the loading platform 4 at a desired location along a section of track 3. It is preferred here to take into account the length of the railway wagons 6 and the railway wagon 6 onto which the container in question is to be loaded. By then stopping the railway wagons at a fixed location, it is then possible to ensure the containers 7 to be loaded only have to be moved sideways. Trucks which are conventional per se and are known, inter alia, from EP-B1-0,509,028 can be used for this sideways movement. By engaging in the so-called corner castings of the containers 7, these trucks 8 can lift the container slightly and then move it in the sideways direction. These trucks 8 can also be used for unloading a container 9 resting on a wagon, for the purpose of removing a container 9 resting on a wagon in the sideways direction of the wagon 6. Containers which have been unloaded from a wagon 6 rest on unloading platform 5 and are denoted by reference number 10. When the trucks 8 have been uncoupled, these unloaded containers 10 can be picked up by a lorry and taken away. It will be clear here that it is wholly conceivable that, when a goods train is at a standstill at the railway terminal, only a certain number of containers are unloaded and/or a number of containers are loaded, while a further number of containers remains in position on the railway wagons or if appropriate on the loading and/or unloading platform in the usual manner.

Figure 2:
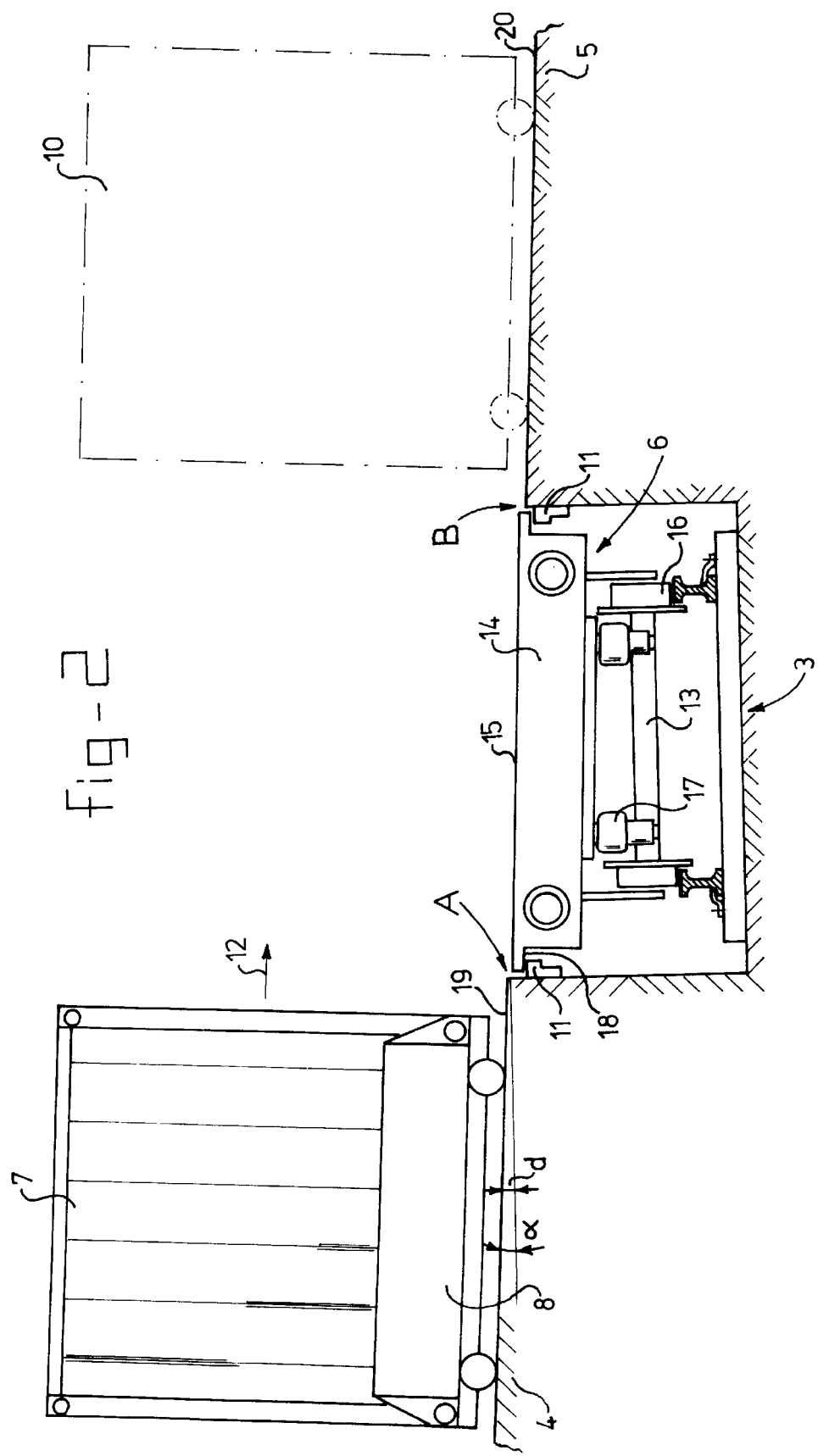
FIG. 2 shows a diagrammatic sectional view in a direction transverse to a section of track, in which various aspects of advantageous embodiments of the invention are shown in more detail.

FIG. 2 diagrammatically illustrates a number of aspects of a railway terminal according to the invention. It is necessary here to distinguish between two main aspects, which can be used in combination with one another, but may also be employed separately, one without the other. The first main aspect relates to providing supports on either side of the section of track for the purpose of supporting the superstructure of a railway wagon; the second main aspect relates to providing a slope on the loading platform and unloading platform.

On the left-hand side, FIG. 2 shows a loading platform 4, and on the right-hand side the Figure shows an unloading platform 5. This loading platform 4 and unloading platform 5 are at a higher level than a section of track 3 situated between them. Supports 11 are provided on both sides of the section of track 3. A container 7 which has been placed on trolleys 8 and is to be placed on a railway wagon 6 is shown on the left-hand side. This container 7 can be moved, by means of the trolleys. from the loading platform 4 in the sideways direction as shown by arrow 12.

FIG. 2 furthermore shows a railway wagon 6 with a substructure 13 bearing the wheels 6 and a superstructure 14 comprising the loading floor 15. The superstructure 14 is supported on the substructure 13 by means of a resilient suspension system. This resilient suspension system comprises pneumatic spring systems 17. Each pneumatic spring system 17 can be pressurized in order to move the superstructure 14 upwards with respect to the substructure 13 and hence with respect to the section of track 3, while on the other hand these pneumatic spring systems 17 can also be let down again, in order to allow the superstructure 14 to be lowered downwards towards the substructure 13 and the section of track 3. The superstructure 14 is provided with downwardly directed stop surfaces 18, by means of which the superstructure 14 can be supported on the supports 11 on either side of the section of track 3.

When the railway wagons 6 approach the railway terminal 1 according to the invention, the superstructures 14 of the railway wagons are, or may already have been, lifted by means of the pneumatic spring systems 17 to a height at which the stop surfaces 18 are at a higher level than the supports 11. When the railway wagons have been brought to a standstill, the pneumatic spring systems 17 are then let down, with the result that the superstructures 14 are lowered downwards until their stop surfaces 18 are supported on the supports 11. This support of the superstructure 14 on the supports 11 ensures that the loading floor 15 is situated at a predetermined, fixed height during loading and unloading. This prevents the superstructure 14 from springing in and out with respect to the substructure 13 during loading and unloading. If it is moreover ensured, firstly, that the vertical distance between the stop surfaces 18 and the loading floor has a specific first value and, secondly, that the distance from the supports 11, or at least the upper supporting surfaces thereof, to the top surface of the associated adjoining platform 4 or 5 has a specific second value, this specific first value and the specific second value preferably being related to one another, it is possible to ensure an essentially flat connection between the loading floor 15 and the adjacent platforms 4 or 5. If the said first value and the said second value are identical, this ensures a precisely flat connection. A difference between the said first specific value and the said second specific value of a few millimetres, for example 1 to 5 mm, up to perhaps 1 cm or, under certain circumstances, even up to 2 cm is, however, also conceivable, since differences in height of this nature can be overcome relatively easily and without special measures by the wheels or rollers of the trolleys 8. According to a particular embodiment, the said first specific value and the said second specific value are even deliberately chosen to be different, and specifically, in particular, different for the left-hand and right-hand sides of the section of track 3. As can be seen in FIG. 2, the top surface 19 of the loading platform 4, at the connection A between the loading platform 4 and the loading floor 15, is at a higher level than the top surface of the loading floor 15. In the direction of transport, indicated by arrow 12, of the container 7, there is then a downward gradient of the ground at the connection A. Such a downward gradient of the ground, unlike an upward gradient of the ground, will not present any problems when transferring the trolley 8 from the loading platform 4 onto the loading floor 15. On the opposite longitudinal side of the railway wagon 6, at the connection B between the loading floor 15 and the unloading platform 5, it is possible to see a corresponding downward gradient, as seen in the direction of transport 12. At this connection B, the top surface of the loading floor 15 is at a higher level than the top surface 20 of the unloading platform 5.

As is also made clear in FIG. 2, on a somewhat enlarged scale for the sake of clarity, according to a further main aspect of the invention the loading platform and the unloading platform are provided with a slope, insofar as the top surface 19 and the top surface 20 of the platforms are arranged at an angle a with respect to the horizontal. The slope d here amounts to approximately 0.5 cm per meter of width (overall in the direction of the arrow 12) of the platform in question. In this case, the slope of the loading platform 4 runs downwards, in the direction of arrow 12, towards the section of track 3, while the slope of the unloading platform 5 slopes downwards in a direction (as per arrow 12) away from the section of track 3. Such a slope of the loading and unloading platform 4 or 5, respectively, facilitates transfer of the containers 7.

With regard to the supports 11, it should be noted that according to a particular embodiment of the invention they may be designed to be laterally (essentially horizontally) movable with respect to the section of track 3. The supports 11 can then be retracted completely into the platform, which is extremely advantageous where the platforms lie close to the track. so that the supports 11 cannot impede arriving, departing or passing wagons 6. If the wagons then have to be supported, mostly after they come to a standstill, the supports 11 can be extended out of the platform. This retraction and extension of the supports 11 may if appropriate be carried out manually, but will preferably take place via an actuable auxiliary, such as a cylinder/piston unit. If the supports 11 are designed to be able to slide in and out of the platform in the sideways direction, it is not necessary to ensure that the superstructure of arriving, departing or passing wagons has been lifted sufficiently far off the substructure.

Figure 3:
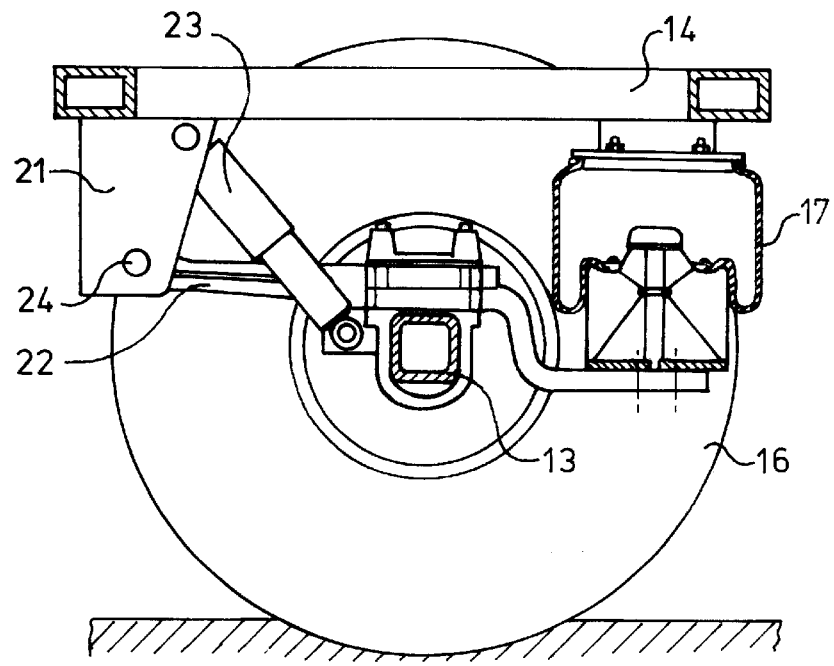
FIG. 3 shows a view, partially in section, of the wheel suspension of a railway wagon according to the invention.

FIG. 3 shows a detailed view of the possible wheel suspension of a railway wagon 6 according to the invention. This figure only shows part of the superstructure 14 (for example, the loading floor 15 lying at a higher level than the wheel 16 is not shown). The superstructure 14 is provided with webs 21, to which a stepped bearing arm 22 is attached such that it can pivot about pivot 24, which bearing arm on its underside bears the substructure 13 to which the wheel 16 is attached. The stepped arm 22 is suspended from the superstructure 14 by means of an air suspension system 17, while a shock absorber 23 is also provided for the purpose of damping/absorbing vibrations and shocks. A suspension of this kind using a stepped arm 22 makes it possible to achieve a relatively low structural height of the railway wagon 6 as a whole. However, variants which are known per se from the prior art can also be used for this purpose. The air suspension system 17 has the major advantage that it results in a relatively low noise level of the railway wagons at relatively high speeds. A further significant advantage, in particular with regard to the present invention, is that an air suspension system 17 of this kind can easily be manipulated so as to move the superstructure 14 upwards and downwards with respect to the substructure 13, so that it becomes possible to lower the superstructure 14 onto supports 11 arranged on either side of a section of track 3.

Figure 4:
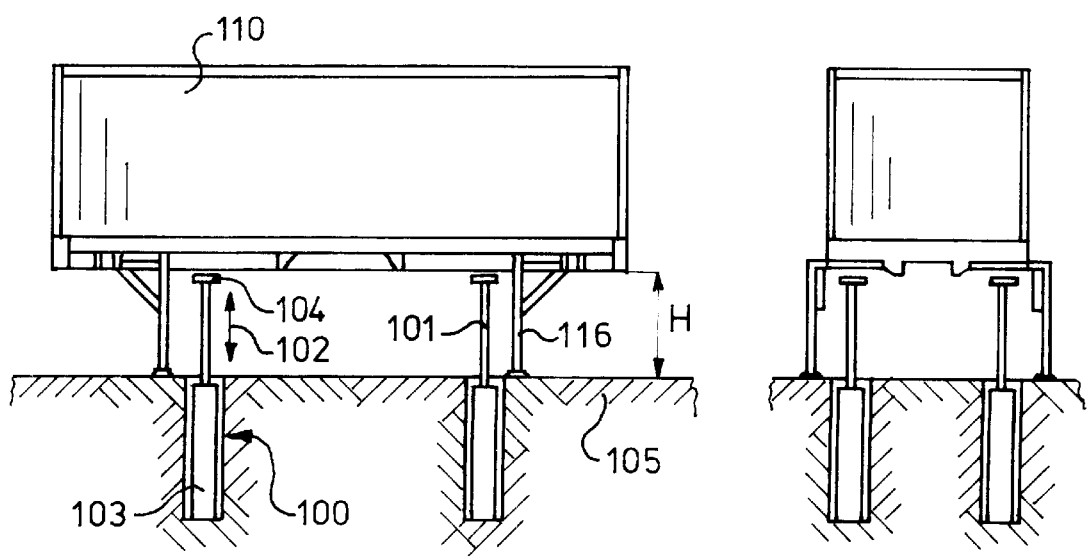
FIG. 4 shows a diagrammatic longitudinal and end view, partially in section, of a lifting device according to the invention.

FIG. 4 shows a completely different aspect, specifically a third main aspect, of the present invention, which can be employed both separately from that which has been discussed previously, but also, advantageously, in combination therewith. FIG. 4 shows a lifting device, which is suitable in particular for placing so-called DIN EN 284 containers 110 with the bottom surface on the ground. DIN EN 284 containers 110 of this kind are fitted with four fold-in and fold-out limbs or legs 116. These containers are delivered by means of lorries, after which the legs are folded out and the lorry is driven away beneath the container(s). In order to bring containers of this kind into a position in which they can be handled and used on a railway terminal according to the invention, the fold-in legs first have to be folded in. To this end, the container has to be lifted, the legs have to be folded in and the container has to be set down. According to the invention, this can be carried out in a very advantageous manner by accommodating four cylinder/piston units 100, which are placed apart in a rectangular pattern, in the ground. These cylinder/piston units 100 may be hydraulically actuated, in order to push the piston rods 101 into and out of the cylinder 103 in the direction of double arrow 102. When using the lifting device according to the invention, all four of the cylinder/piston units will preferably move jointly. The free ends of the piston rods 101 are provided with bearing parts 104. In order to lift the DIN EN 284 container 110, the bearing parts 104 can be extended, by means of the piston rods 101, to a height which is greater than the standing height H. which is the height of the base of the container 110 above the ground 105 in the folded-out position of the legs 116. Therefore, when the container 110, together with legs 116, is lifted off the ground 105, the legs 116 can be folded in, and the piston rods 101 can be retracted again until the container 110 rests with its base 106 on the ground 105. The bearing parts 104 or support plates 105 can then be retracted down to and lowered into the ground 105. It will be clear that the lifting device as shown in FIG. 4 can be used both to fold in the legs 116 and to set the base 106 of the container 110 down on the ground, as well as to lift the container 110 off the ground, fold out the legs 116 and place the container on the ground on its legs 116. A lifting device as shown in FIG. 4 can easily be incorporated in a loading and/or unloading platform directly next to the section of track 3, as indicated diagrammatically in FIG. 1 by the reference numerals 110. Furthermore, it will be clear that the support plates 104 of adjacent cylinder/piston units may be connected together to form a supporting beam. It will also be clear that if the support plates 104 are sufficiently wide. optionally with further support, two cylinder/piston units may also be sufficient.

All of the subject-matter of this patent application, and certainly the subject-matter to which the claims relate. can also be used advantageously at a railway terminal in accordance with:

Dutch patent application 1005475 (as well as NL-A-1005455) filed by the Applicant and a further application of applicant filed simultaneously with this application for the same country/countries.

What is claimed is:

1. Railway terminal (1) for loading railway wagons (6) with containers (7, 9, 10) and/or unloading railway wagons (6) which are laden with containers (7, 9, 10), comprising:

a section of track (3), and at least one loading (4) and/or unloading platform (5) which is arranged along and adjacent to the said section of track (3) and which is at a higher level than the said section of track (3), supports arranged on either side of the section of track (3), and at least one railway wagon (6) having a superstructure (14) comprising a loading floor (15), the railway wagon (6) being provided with setting means (17) with which the superstructure (14) can be vertically adjusted with respect to the section of track (3) so as to be moved upwards from the supports (11) and to be supported on the supports (11), in such a manner that the loading floor (15) of the said railway wagon (6) is held at a fixed, predetermined height during loading and/or unloading, wherein said supports have upper support faces to support said superstructure which face unobstructed in an upward direction when no superstructure is supported thereon.

2. The railway terminal (1) according to claim 1, characterized in that the said railway wagon (6) is provided with a hydraulic or pneumatic suspension (17) which forms the setting means and is designed so that it can be activated in order to move the superstructure (14) above the supports (11) or move it upwards and so that it can be let down in order to support the superstructure (14) on the supports (11).

3. Railway terminal (1) according to claim 1, wherein the superstructure (14) of the railway wagon (6) is provided on either side with downwardly facing top surfaces (18), by means of which the railway wagon (6) can be supported on the supports (11).

4. Railway terminal (1) according to claim 1, wherein the supports (11) are arranged at such a height that, in the position where the superstructure (14) of the railway wagon (6) is supported on them, there is an essentially flat connection between the loading floor (15) and the respectively adjoining loading and/or unloading platform (4 respectively 5).

5. Railway terminal (1) according to claim 4, characterized in that an abovementioned loading platform (4) is arranged on one side of the section of track (3), in that an abovementioned unloading platform (5) is arranged on the other side of the section of track (3), and in that, in the supported position, the loading floor (15), for the essentially flat connection to the loading platform (4), lies at a lower level than the top surface (19) of the loading platform (4) and, for the essentially flat connection to the unloading platform (5), lies at a higher level than the top surface (20) of the unloading platform (5).

6. Railway terminal according to claim 5, wherein the top surface (19) of the loading platform (4) and the top surface (20) of the unloading platform (5) are essentially aligned with each other.

7. Railway terminal (1) according to claim 1, and comprising:

an above mentioned loading platform (4) arranged on one side of the section of the track (3), and/or an above mentioned unloading platform (5) arranged on the other side of the said section of track (3), in which the top surface (19) of the loading platform (4) slopes downwards towards the section of track (3), and respectively or in which the top surface (2) of the unloading platform (5) slopes down away from the section of track (3).

8. Railway terminal according to claim 7, characterized in that the slope of the loading platform (4) and respectively or the slope of the unloading platform (5) amounts to approximately 0.1 cm to 0.8 cm, for example approximately 0.5 cm, per metre of platform width.

9. Railway terminal according to claim 1, wherein the supports (11) are designed such that they can be displaced sideways away from and towards the section of track (3).

10. A railway terminal for loading railway wagons with containers and/or unloading railway wagons which are laden with containers, comprising:

a section of track, at least one loading and/or unloading platform which is arranged along and adjacent to the said section of track and which is at a higher level than the said section of track, supports arranged on either side of the section of track, and at least one railway wagon having a superstructure comprising a loading floor, the railway wagon being provided with setting means with which the superstructure can be vertically adjusted with respect to the section of track so as to be moved upwards from the supports and to be supported on the supports, in such a manner that the loading floor of the said railway wagon is held at a fixed, predetermined height during loading and/or unloading, wherein the supports are arranged at such a height that, in the position where the superstructure of the railway wagon is supported on them, there is an essentially flat connection between the loading floor and the respectively adjoining loading and/or unloading platform, and wherein said loading platform is arranged on one side of said section of track and said unloading platform is arranged on the other side of said section of track, in that, in the supported position, the loading floor, for the essentially flat connection to the loading platform, lies at a lower level than the top surface of the loading platform, and for the essentially flat connection to the unloading platform, lies at a higher level than the top surface of the unloading platform.

11. A railway terminal for loading railway wagons with containers and/or unloading railway wagons which are laden with containers, comprising:

a section of track, at least one loading and/or unloading platform which is arranged along and adjacent to the said section of track and which is at a higher level than the said section of track, supports arranged on either side of the section of track, and at least one railway wagon having a superstructure comprising a loading floor, the railway wagon being provided with setting means with which the superstructure can be vertically adjusted with respect to the section of track so as to be moved upwards from the supports and to be supported on the supports, in such a manner that the loading floor of the said railway wagon is held at a fixed, predetermined height during loading and/or unloading, wherein said loading platform is arranged on one side of the section of the track, and/or said unloading platform is arranged on the other side of the said section of track, in which the top surface of the loading platform slopes downwards towards the section of track, and respectively or in which the top surface of the unloading platform slopes down away from the section of track.

12. The railway terminal according to claim 11, wherein the slope of the loading platform and/or the slope of the unloading platform is within the range of approximately 0.1 cm to 0.8 cm per meter of platform width.

13. The railway terminal according to claim 12, wherein the top surface of the loading platform and the top surface of the unloading platform are essentially aligned with each other.

14. The railway terminal according to claim 11, wherein the top surface of the loading platform and the top surface of the unloading platform are essentially aligned with each other.

15. A railway terminal for loading railway wagons with containers and/or unloading railway wagons which are laden with containers, comprising:

a section of track, at least one loading and/or unloading platform which is arranged along and adjacent to the said section of track and which is at a higher level than the said section of track, supports arranged on either side of the section of track, and at least one railway wagon having a superstructure comprising a loading floor, the railway wagon being provided with setting means with which the superstructure can be vertically adjusted with respect to the section of track so as to be moved upwards from the supports and to be supported on the supports, in such a manner that the loading floor of the said railway wagon is held at a fixed, predetermined height during loading and/or unloading, wherein the supports are designed such that they can be displaced sideways away from and towards the section of track.

* * * * *